(12) United States Patent
Atkin et al.

(10) Patent No.: US 7,793,262 B2
(45) Date of Patent: Sep. 7, 2010

(54) METHOD AND APPARATUS FOR FACILITATING SOFTWARE TESTING AND REPORT GENERATION WITH INTERACTIVE GRAPHICAL USER INTERFACE

(75) Inventors: Steven Edward Atkin, Austin, TX (US); Mark Edward Davis, Menlo Park, CA (US); Michael Francis Moriarty, Byron, MN (US); Dale Martin Schultz, Chelmsford, MA (US); William James Sullivan, Bethel, CT (US); Luis M. Zapata, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 1150 days.

(21) Appl. No.: 10/902,476

(22) Filed: Jul. 29, 2004

(65) Prior Publication Data

US 2006/0026464 A1    Feb. 2, 2006

(51) Int. Cl.
 G06F 9/44 (2006.01)
 G06F 11/00 (2006.01)
(52) U.S. Cl. .................... 717/125; 717/124; 714/38
(58) Field of Classification Search ......... 717/124–135, 717/38; 714/37, 38
 See application file for complete search history.

(56) References Cited

U.S. PATENT DOCUMENTS

| | | | | | |
|---|---|---|---|---|---|
| 5,274,801 | A | * | 12/1993 | Gordon et al. | 707/3 |
| 5,664,206 | A |   | 9/1997  | Murow et al. |  |
| 5,671,351 | A | * | 9/1997  | Wild et al. | 714/38 |
| 5,678,039 | A |   | 10/1997 | Hinks et al. |  |
| 5,758,061 | A | * | 5/1998  | Plum | 714/35 |
| 6,163,805 | A | * | 12/2000 | Silva et al. | 709/227 |
| 6,219,654 | B1 |  | 4/2001  | Ruffin |  |
| 6,381,604 | B1 | * | 4/2002  | Caughran et al. | 707/10 |
| 6,557,120 | B1 | * | 4/2003  | Nicholson et al. | 714/38 |
| 6,826,745 | B2 | * | 11/2004 | Coker et al. | 717/115 |
| 6,948,153 | B2 | * | 9/2005  | Bowers | 717/124 |
| 6,966,048 | B2 | * | 11/2005 | Bowers | 717/101 |
| 6,996,805 | B2 | * | 2/2006  | Achlioptas et al. | 717/124 |
| 7,080,303 | B2 | * | 7/2006  | Bowers | 714/741 |
| 7,143,391 | B1 | * | 11/2006 | Guo | 717/124 |
| 7,240,019 | B2 |  | 7/2007  | Delurgio et al. |  |
| 2002/0095391 | A1 |  | 7/2002  | Swart et al. |  |
| 2002/0156902 | A1 | * | 10/2002 | Crandall | 709/228 |
| 2002/0165834 | A1 |  | 11/2002 | Delurgio et al. |  |
| 2003/0041095 | A1 |  | 2/2003  | Konda et al. |  |
| 2003/0046059 | A1 |  | 3/2003  | Litster et al. |  |
| 2003/0120477 | A1 |  | 6/2003  | Kruk et al. |  |
| 2003/0192040 | A1 |  | 10/2003 | Vaughan |  |
| 2003/0233149 | A1 |  | 12/2003 | Hodorek |  |
| 2003/0233249 | A1 |  | 12/2003 | Walsh et al. |  |
| 2004/0015868 | A1 | * | 1/2004  | Dutta et al. | 717/126 |
| 2004/0128263 | A1 |  | 7/2004  | Dosamjh |  |

(Continued)

*Primary Examiner*—Wei Y Zhen
*Assistant Examiner*—Qing Chen
(74) *Attorney, Agent, or Firm*—Yee & Associates, P.C.; David A. Mims, Jr.

(57) ABSTRACT

A method, apparatus, and computer instructions for testing software. A set of questions regarding the application is presented, wherein the set of questions are selected from a database. In response to receiving a user input to the set of questions, the application is tested to form identified testing. In response to identifying testing, a testing report is generated using the identified testing, wherein the testing report includes links to testing instructions for the identified testing for the application.

8 Claims, 12 Drawing Sheets

U.S. PATENT DOCUMENTS

| | | | |
|---|---|---|---|
| 2004/0267607 A1* | 12/2004 | Maddux | 705/11 |
| 2005/0071286 A1 | 3/2005 | Laicher et al. | |
| 2005/0144592 A1* | 6/2005 | Below et al. | 717/124 |
| 2005/0172269 A1* | 8/2005 | Johnson et al. | 717/124 |
| 2006/0190417 A1 | 8/2006 | Hilkemeyer et al. | |

* cited by examiner

| | | |
|---|---|---|
| ★ | ▶ DOES THE SOFTWARE ALLOW ACCELERATOR/HOT KEYS? | 2 |
| ★ | ▶ DOES THE SOFTWARE ALLOW ADDRESS INPUT? | 6 |
| ★ | ▶ DOES THE SOFTWARE ALLOW CURRENCY INPUT? | 12 |
| | ▶ DOES THE SOFTWARE ALLOW DATE OR TIME INPUT? | 2 |
| ★ | ▶ DOES THE SOFTWARE ALLOW DOMAIN NAMES? | 1 |
| | ▶ DOES THE SOFTWARE ALLOW DURATION INPUT? | 1 |
| ★ | ▶ DOES THE SOFTWARE ALLOW EMAIL? | 2 |
| | ▼ DOES THE SOFTWARE ALLOW HUMAN NAMES? ⁠— 602   604 | 1 |
| |   ▶ DOES THE SOFTWARE USE MULTIPLE FIELDS TO CAPTURE A PERSON'S NAME? | 1 |
| | ▶ DOES THE SOFTWARE ALLOW INPUT OR SELECTION OF FILE/PRINTER/PATH NAMES? | 4 |
| | ▶ DOES THE SOFTWARE ALLOW LOCALE OR REGIONAL SETTING TO BE MODIFIED? | 1 |
| ★ | ▶ DOES THE SOFTWARE ALLOW NUMERIC INPUT? | 3 |

*FIG. 7*

| |
|---|
| ▶ 500 DOES THE SOFTWARE ALLOW CURRENCY INPUT? ⁠— 700          702 |
| ▶ 500 DOES THE SOFTWARE RECEIVE CURRENCY DATA AS INTEGER OR FLOATING POINT VALUES? |

*FIG. 8*

| | |
|---|---|
| DOES THE SOFTWARE PRODUCE OUTPUT FOR A HUMAN? 81 ⁠— 800 | |
| ① 500 TRANSLATED MESSAGE PRESENTATION | 802 ⟳ ENSURE THAT ALL SCRIPTS THAT MAY BE USED FOR THE TRANSLATED TEXT CAN BE PROPERLY DISPLAYED. |
| ① 500 MESSAGE CONCATENATION | 804 ⟳ ENSURE THAT NO VISIBLE SENTENCES HAVE NOT BEEN CONSTRUCTED ON THE FLY BY CONCATENATING MULTIPLE STRING RESOURCES. |

Globalization Verification Testing Wizard Report – Microsoft Internet Explorer

Globalization Verification Testing Wizard Report

Overview
Based on your input the Globalization Verification Testing Wizard has determined that a number of areas require globalization testing. These test areas appear in the *Areas to be tested* section and those areas that do not require globalization testing appear in the *Areas not to be tested*.

Please note: The recommendations provided in the Globalization Verification Testing Wizard are based on the best available analysis of the information you provided. For individualized advice regarding globalization testing, please send an email to the GCoC in which you provide the details that are relevant to your specific project. Our experts will provide guidance that is tailored to your specific situation.

Areas to be tested

Q: Does the software accept input from a human? A: Yes

| | |
|---|---|
| Chinese national character standard GB18030 (Sev:1) — 1304 | • Ensure that the Han characters and non-Han characters such as Uygur, Tibetan, Mongolian and Yi can be input. How to test this area — 1314 |
| Input of text from clipboard (Sev:1) | • Ensure that all Unicode characters can be cut, copy, and pasted. How to test this area — 1316 (1306) |
| | • Ensure that the characters boundaries are honored during cut, copy, and pasting. In particular, code point boundaries must be respected: isolated surrogates are not copied. How to test this area — 1318 (1308) |
| | • Ensure that there is no loss of control codes and other formatting characters during cut and paste. How to test this area — 1320 (1310) |
| | • Ensure that the logical ordering of characters is respected during selection, cut, and pasting. For example, bidirectional text. How to test this area — 1322 (1312) |
| | • Ensure that if any meta information is present, and representable in target, that it is transformed. How to test this area — 1324 (1315) |

However, if the product does not use Java/ICU, tester may ensure that the date and time is formatted in other internationalization formatting rules such as Linux, AIX and so on. The following table sample test data of Linux date and time format.

Tester may ensure that test data " 2005-07-31 03:25:35 (in ISO format)" is formatted below on Linux environment.

| Linux Date Format Examples | | |
|---|---|---|
| Locale description | Locale identifier | Date format |
| Russian in Russia | ru_RU.UTF-8 | 31 июля 2005 г. |
| Simplified Chinese in China | zh_CN.UTF-8 | 2005 年7 月31日 |
| French in France | fr_FR.UF-8 | dimanche 31 juillet 2005 |
| Japanese in Japan | ja_JP.UTF-8 | 2005年7 月31日 |
| Arabic in Egypt | ar_EG.UTF-8 | 31 2005, يوليو |
| Hindi in India | hi_IN.UTF-8 | रविवार 31 जुलई 2004 |

| Linux Time Format Examples | | | |
|---|---|---|---|
| Locale description | Locale identifier | 24h style | 12h style |
| Russian in Russia | ru_RU.UTF-8 | 03:25:35 GMT | N/A |
| Simplified Chinese in China | zh_CN.UTF-8 | 03时25分35秒 GMT | N/A |
| French in France | fr_FR.UF-8 | 03 h 25 GMT | N/A |
| Japanese in Japan | ja_JP.UTF-8 | 03時25分35秒 GMT | 午前03時25分35秒 |
| Arabic in Egypt | ar_EG.UTF-8 | GMT 03:25:35 | GMT 03:25:35 ص |
| Hindi in India | hi_IN.UTF-8 | 03:25:35 GMT | 03:25:35 जुलई GMT |

*FIG. 18*  1800

| Category | Class | Character name | Character & Code point for Cut&Paste | Glyph image | UTF-8 | EBCDIC | PC | AIX |
|---|---|---|---|---|---|---|---|---|
| Common Characters Syntactic characters | C1 | LATIN CAPITAL LETTER A | A / U+0041 | A | 0x41 | CCSID 1399 (1390) / X'C1' | CCSID 943 / 0x41 | CCSID 33722 / 0x41 |
| | | DIGIT ZERO | 0 / U+0030 | 0 | 0x30 | X'F0' | 0x30 | 0x30 |
| | | LOW LINE | — / U+005F | — | 0x5F | X'6D' | 0x5F | 0x5F |
| | | ASTERISK | * / U+002A | * | 0x2A | X'5C' | 0x2A | 0x2A |
| | | AMPERSAND | & / U+0026 | & | 0x26 | X'50' | 0x26 | 0x26 |
| | | LATIN | | | | | | |

Appendix A. Summary of Unicode sample test data for GVT

METHOD AND APPARATUS FOR FACILITATING SOFTWARE TESTING AND REPORT GENERATION WITH INTERACTIVE GRAPHICAL USER INTERFACE

BACKGROUND OF THE INVENTION

1. Technical Field

The present invention relates generally to an improved data processing system and in particular to a method and apparatus for processing data. Still more particularly, the present invention relates to a method, apparatus, and computer instructions for testing software.

2. Description of Related Art

In designing and producing applications, developers far increasingly concerned with insuring that the applications performed correctly in different countries and cultures. Developers desire to have applications that can be used globally. Globalization involves the proper design and execution of systems, software, services, and procedures such that one instance of an application, executing on a single server or multi-user machine may process multilingual data and present data in a culturally correct manner in a multicultural environment such as the Internet.

This presentation of data includes, for example, allowing individual users to select a language for the user interface in which the language may differ from the language of the data being processed. Another example is presenting information, such as dates and numbers, in a culturally correct manner for each user even if they are from different countries.

Currently, development teams rely on translation verification testing to catch basic globalization problems. This type of testing involves having personnel, such as a translator or tester selected by the translating country to perform tests. One such test involves reviewing the translated program integrated information (PII) after build or integration and compilation to verify that the translation has not been haltered or corrupted by any of these processes. Other tests may include checking for the proper formatting and presentation of data that varies by language and country. Further, these personnel may make the necessary changes for consistency and accuracy.

This type of testing is costly and ineffective. Early detection and correction is desired. As a result, many globalization problems often go unfixed as their discovery is late in the development cycle. Therefore, some form of testing that enables detection and correction of globalization problems early in the software development cycle is required. This type of testing is known as globalization verification testing (GVT). GVT becomes more critical as more applications are designed to support the global marketplace.

In reaching the goal of globalization for applications, global verification tests may be performed on the applications prior to those applications being released for use. In performing such a task, a verification of the translatability and basic globalization support is made during the functional testing phase of a product. These tests take place before any translation verification testing.

The task of testing a product for proper globalization support is often very difficult for test teams that do not have a resident globalization subject matter expert. Globalization subject matter experts are almost always needed to determine which features of a product are subject to language and cultural influences. The lack of globalization experts has led to inadequate globalization testing of products. In addition, as software components are combined to produce new products, no easy way is present to determine if all components in a product have undergone the same level of globalization testing. These problems have delayed the discovery of globalization defects until very late in the development cycle or even worse after the product has shipped.

Therefore, it would be advantageous to have improvement, apparatus, and computer instructions for testing applications.

SUMMARY OF THE INVENTION

The present invention provides a method, apparatus, and computer instructions for testing software. A set of questions regarding the application is presented, wherein the set of questions are selected from a database. In response to receiving a user input to the set of questions, one or more tests for a part of the application are identified for testing. In response to identifying the tests, a testing report is generated using the identified tests. The testing report includes links to testing instructions for the identified tests for testing the part of the application.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 13 is a diagram illustrating a sample testing report in accordance with a preferred embodiment of the present invention;

DETAILED DESCRIPTION OF THE PREFERRED EMBODIMENT

Figure 1:
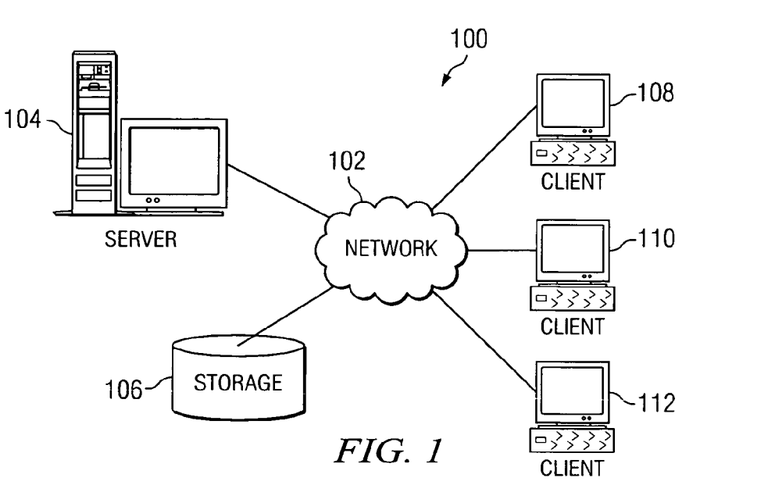
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is an example of an environment in which globalization testing may be performed in accordance with the preferred embodiments of the present invention. A globalization testing system including an expert database may be implemented within network data processing system 100 for globalization testing.

Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
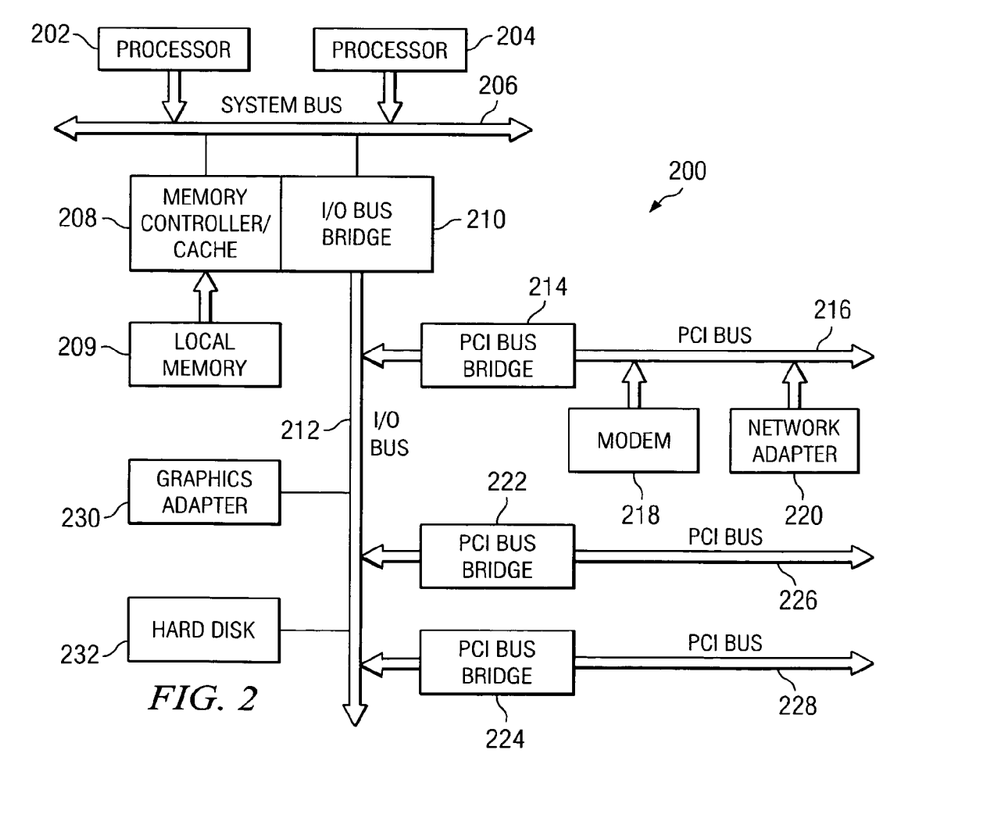
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
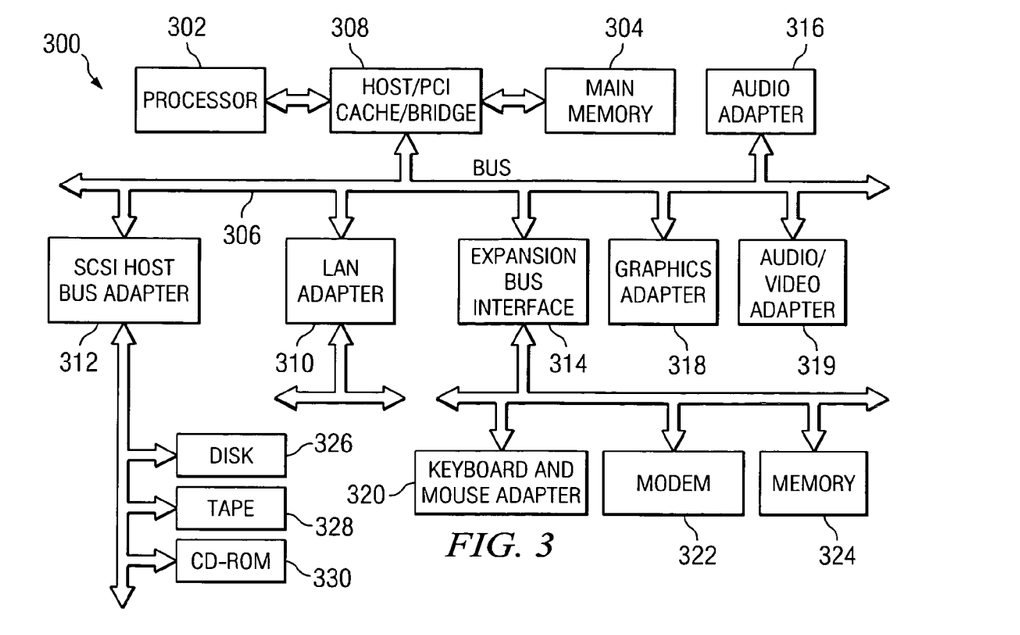
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for testing applications. The mechanism of the present invention is directed towards globalization verification in the illustrated examples, but may be applied to other types of testing for applications.

According to an illustrative embodiment in testing an application, a set of questions is presented regarding the application in which these questions are selected from a database. In response to receiving user input to these questions, areas or parts of the application are identified for testing. In response to identifying these testing areas or parts, a testing report is generated. This testing report includes links to testing instructions for the parts or areas of the application identified for testing. In addition, this report also may include areas or parts of the application that do not require testing in these illustrative examples.

Figure 4:
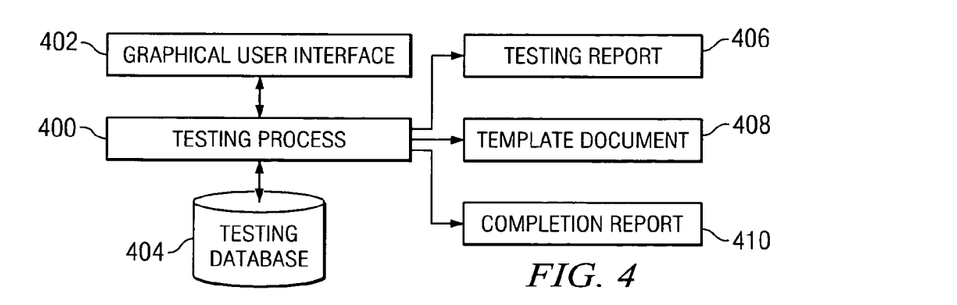
FIG. 4 is a diagram illustrated component used in testing applications in accordance with a preferred embodiment of the present invention.

With reference next to FIG. 4, a diagram illustrated component used in testing applications is depicted in accordance with a preferred embodiment of the present invention. In this illustrative example, the testing is applied to globalization verification requirements. Globalization (G11N) is the proper design and execution of systems, software, services, and procedures so that one instance of software, executing on a single server or end user machine, can process multilingual data, and present data culturally correctly in a multicultural environment such as the Internet. Presentation of data includes (a) allowing each individual user to select a language for the user interface and that language may differ from the language of the data that is being processed, and (b) presenting information, such as dates and numbers, culturally correctly for each user even if they are from different regions.

Testing process 400 contains the processes for a software expert or wizard that determines aspects of an application that require special globalization testing in these illustrative examples. Testing process 400 presents questions and receives user input through graphical user interface 402. These questions are identified using testing database 404 in this illustrative example.

Testing process 400 generates testing report 406 after the questions have been presented and user input has been received. This report details areas or parts of the application that are to be tested along with what areas or parts of the application that do not require testing. Further, testing report 406 includes links to testing instructions or guides for each identified part. These testing guides provide detailed instructions on how to specifically validate whether an identified part of the application is behaving correctly with respect to the globalization requirements. The instructions or guides also may include data for use in testing.

This information in testing report 406 may be placed into template document 408. This document serves as a contract or requirement for the testing that is to be performed. Template document 408 may be used by a development team to identify what type of testing will be required. Additionally, completion report 410 is generated, after testing, through user input into a graphic user interface after testing on the application has been performed. This report contains an identification of what tests were performed or not performed as well as the results of the testing.

These components in FIG. 4 provide a software version of a human globalization expert. The components for this testing wizard determines through a series of questions, which aspects of an application require special globalization testing. The components in these examples form an expert system that understands which product features are sensitive to language and cultural changes.

Testing database 404 contains questions and an area for storing responses to the questions. Testing database 404 contains a question and answer methodology that enables a user to identify the minimal set of globalization requirements applicable to a particular software application or component. In these examples, the questions are arranged according to the fundamental users of the application and the basic operation performed by the application. Testing database 404 may have multiple levels of refinement in which different questions and phrasing of questions may vary according to the top level in which a question occurs.

Graphical user interface 402 is implemented as a Java 2. Enterprise application in these illustrative examples. Those skilled in the art will recognize that other development methodologies (e.g., Java Application, Java Applet, and Windows NET) could be used to implement the human globalization expert. This interface manages to use and generate testing reports, such as testing report 406. Additionally, graphical user interface 402 receives user input for completion report 410 as well as presenting template document 408.

In these illustrative examples, template document 408 is used to identify what globalization requirements are to be tested and when these tests are to be performed. This template does not contain details of how the testing requirements are to be tested in these illustrative examples. Instead, this template is more akin to a contract detailing what actions are to be taken and also may include time tables for the completion of the actions. The content for testing database 404 may come from many sources. For example, the source of the questions may come from testing plans, assessments of applications, and input from globalization experts.

Although the illustrative examples are directed towards testing an application with respect to globalization verification, mechanism of the present invention may be applied to other types of testing for applications. For example, the components in FIG. 4 may be applied to identifying various parts of an application to be tested with respect to other aspects, such as, for example, accessibility, and security, and basic functionality. Accessibility testing may be identified to allow an application to be tested for accessibility for different users including those that are visually handicapped or physically challenged. Security testing may be identified for an application to discover security weaknesses in the application.

Figure 5:
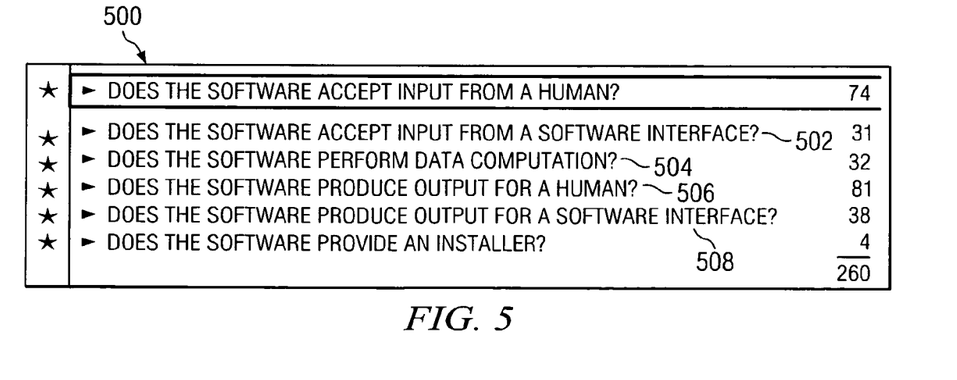
FIG. 5 is a diagram illustrating example questions from a requirements database in accordance with a preferred embodiment of the present invention.

With reference now to FIG. 5, a diagram illustrating example questions from a requirement's database is depicted in accordance with a preferred embodiment of the present invention. Questions 500 in this example are found in a requirements database, such as testing database 404 in FIG. 4. These questions are arranged with respect to users of the application and operations performed by the application. For example, questions 502 and 504 are directed towards application operations, while questions 506 and 508 are directed towards users of the application. Answers to these questions may result in additional questions being selected from the database for presentation and answering by a user.

Figure 6:
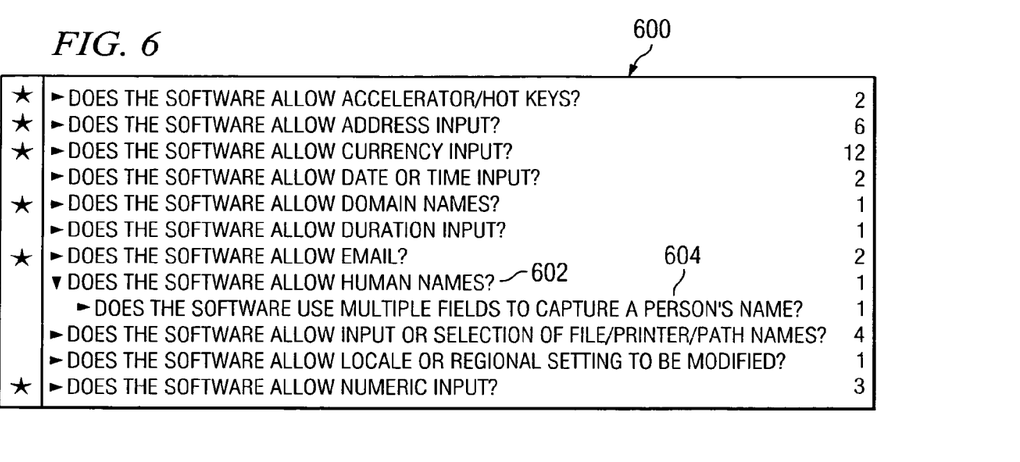
FIG. 6 is examples of questions from a requirements database in accordance with a preferred embodiment of the present invention.

Turning now to FIG. 6, examples of questions from a requirements database are depicted in accordance with a preferred embodiment of the present invention. In these examples, questions 600 are examples of additional questions that may be presented to a user from a database, such as testing database 404 in FIG. 4. Questions 600 may include questions that contain additional levels of requirement.

For example, question 602 reads "does the software allow human names?". If the answer to these questions is yes, an additional question, question 604, is presented to the user to determine whether the software uses multiple fields to capture a person's name. Additional levels of requirement may occur depending on the answer to question 604.

Figure 7:
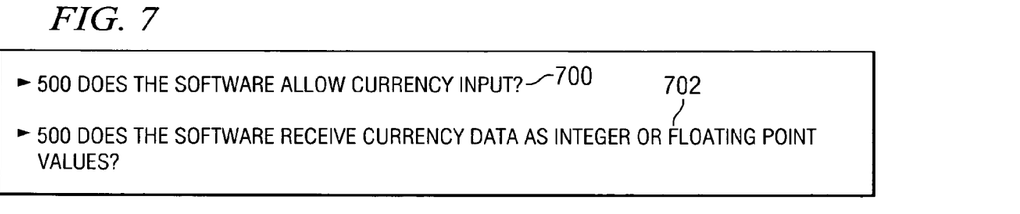
FIG. 7 is example questions from a requirement database illustrating phrasing in accordance with a preferred embodiment of the present invention.

Turning now to FIG. 7, example questions from a requirement database illustrating phrasing are depicted in accordance with a preferred embodiment of the present invention. The questions in this depicted example may be found in a database, such as testing database 404 in FIG. 4. In this example, question 700 is directed towards a human using interface, while question 702 is directed towards a software or application interface.

Figure 8:
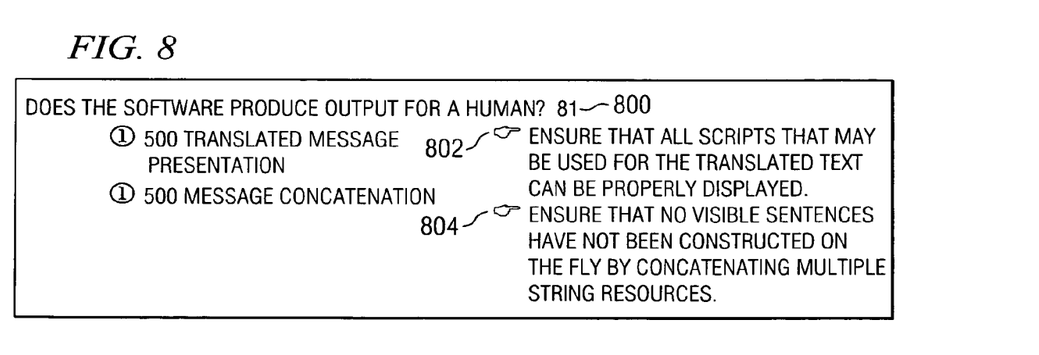
FIG. 8 is a diagram illustrating areas or parts of an application to be tested in response to answers to questions in accordance with a preferred embodiment of the present invention.

Turning now to FIG. 8, a diagram illustrating areas or parts of an application to be tested in response to answers to questions is depicted in accordance with a preferred embodiment of the present invention. If the answer to question 800 is yes in this example, test 802 and test 804 are identified as areas in the application that are to be tested. This example shows that one or more areas or parts of the application are to be tested in response to an answer to a question.

Figure 9:
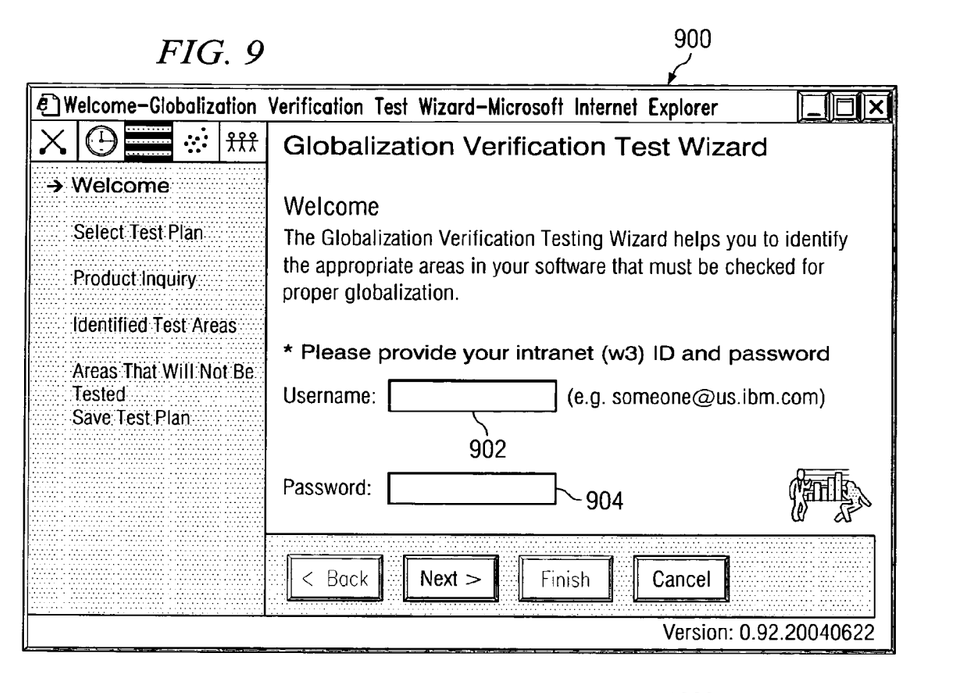
FIG. 9 is a diagram illustrating a graphical user interface in accordance with a preferred embodiment of the present invention.

Turning now to FIG. 9, a diagram illustrating a graphical user interface is depicted in accordance with a preferred embodiment of the present invention. In this example, screen 900 illustrates a global verification test wizard, which may be presented through a graphical user interface, such as graphical user interface 402 in FIG. 4. In screen 900, field 902 and field 904 provide an area for a user to input logon information.

Figure 10:
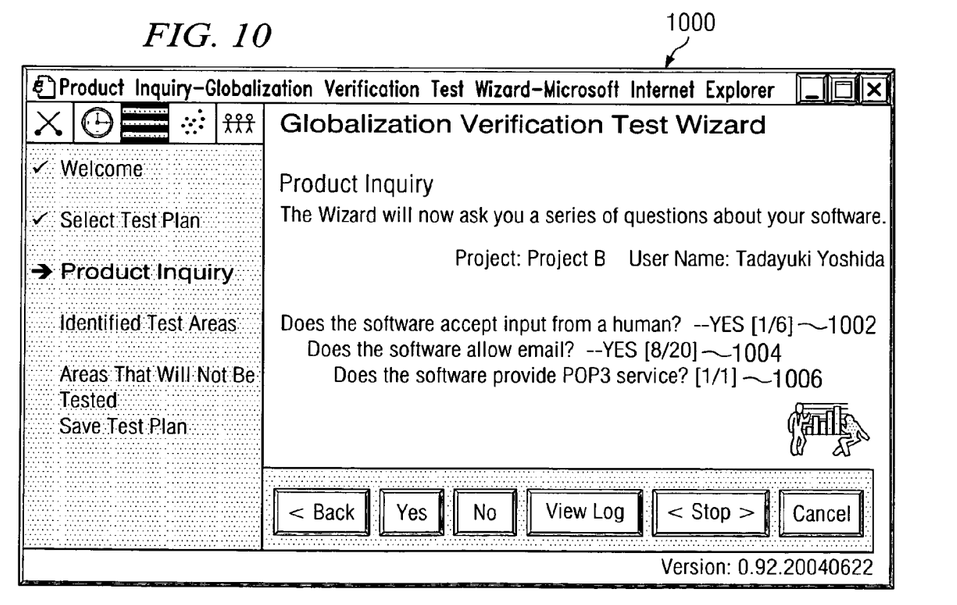
FIG. 10 is a graphical user interface for application testing in accordance with a preferred embodiment of the present invention.

Turning now to FIG. 10, a graphical user interface for application testing is depicted in accordance with a preferred embodiment of the present invention. In response to logging in to screen 900 in FIG. 9, screen 1000 in FIG. 10 is presented to the user. In this example, screen 1000 informs the user that a series of questions about the application will be asked with initial questions 1002, 1004, and 1006 being presented to the user.

Figure 11:
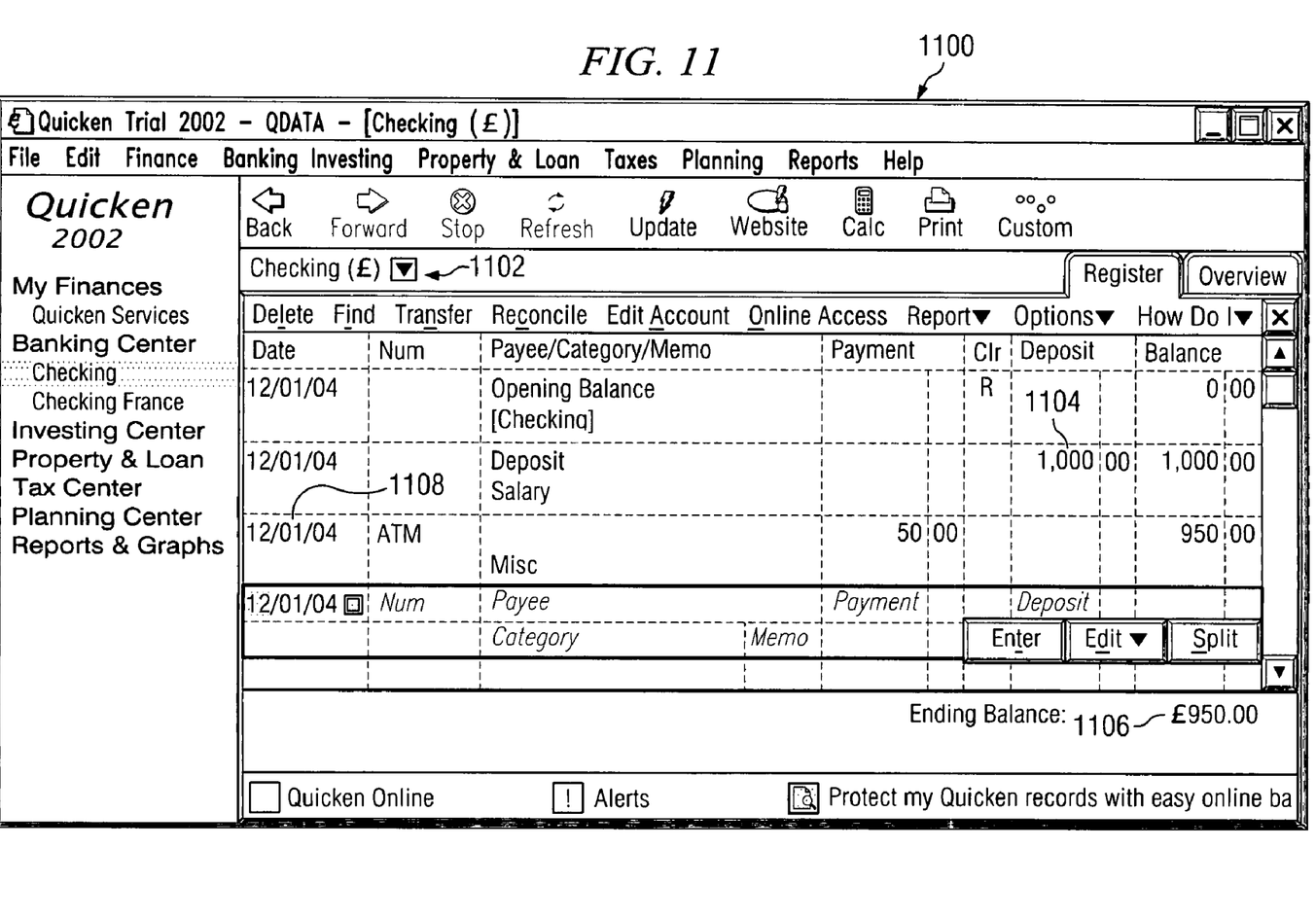
FIG. 11 is a diagram illustrating examples of areas to be tested in an application in accordance with a preferred embodiment of the present invention.

Turning now to FIG. 11, a diagram illustrating examples of areas to be tested in an application is depicted in accordance with a preferred embodiment of the present invention. In performing tests, determinations are made as to whether dates and/or times are displayed properly with respect to globalization requirements. Additionally, a determination may be made as to whether the software correctly displays currency. Other questions that are made with respect to this application are whether the application accepts input from a human and if so if text input is allowed as well as currency input. Another question that is asked with respect to this application is whether the application allows for a date or time input and whether accelerator or hot keys are present for the application.

In this example, screen 1100 illustrates a financial application in which date and currency testing may be performed. For example, element 1102, 1104, and 1106 show areas in which appropriate currency identifications should be taken in to account.

Additionally, element 1108 is an example of a date format. These different formats may change depending on the geographical or cultural selection made by the user. These are examples of items that could be tested in the application to ensure that they meet globalization standards.

Figure 12:
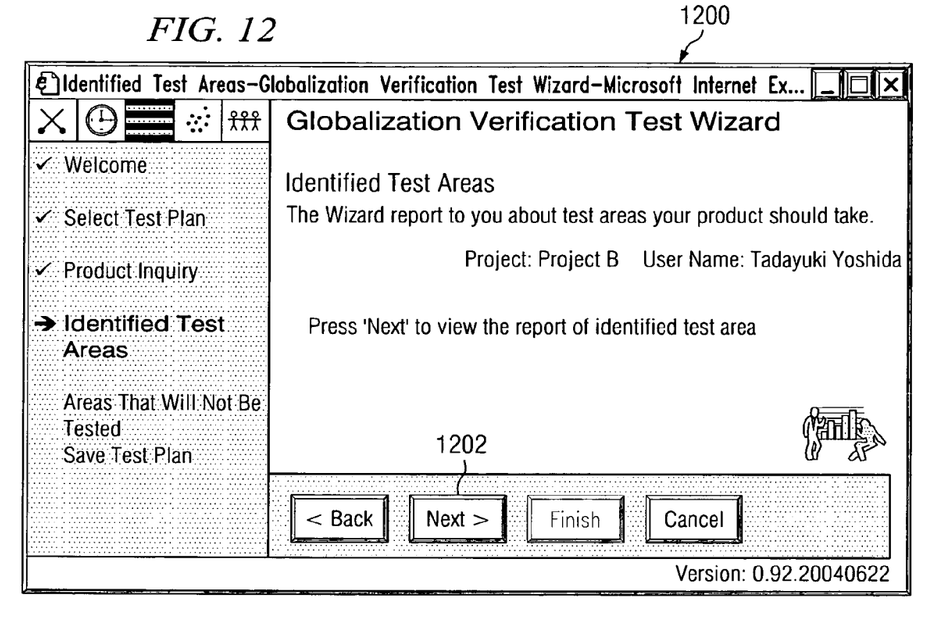
FIG. 12 is a diagram of a screen in a testing process in accordance with a preferred embodiment of the present invention.

Turning next to FIG. 12, a diagram of a screen in a testing process is depicted in accordance with a preferred embodiment of the present invention. In this example, screen 1200 indicates that test areas have been identified for the application. Those test areas may be displayed on a report by selecting next button 1202 in this illustrative example.

Turning now to FIG. 13, a diagram illustrating a sample testing report is depicted in accordance with a preferred embodiment of the present invention. Report 1300 is displayed within screen 1302 in this illustrative example. Report 1300 is an example of a testing report, such as testing report 406 in FIG. 4.

Sections 1304, 1306, 1308, 1310, 1312, and 1314 illustrate areas or parts of the application to be tested. Each of these sections includes a link to more detailed testing instructions or guides. For example, section 1304 contains 1314, section 1306 contains link 1316, section 1308 contains link 1318, section 1310 contains link 1320, section 1312 contains link 1322, and section 1314 contains link 1324 in these illustrative examples. Selection of these links displays detailed testing information to the user. This information may include, for example, testing instructions and data for use in the tests.

Figure 14:
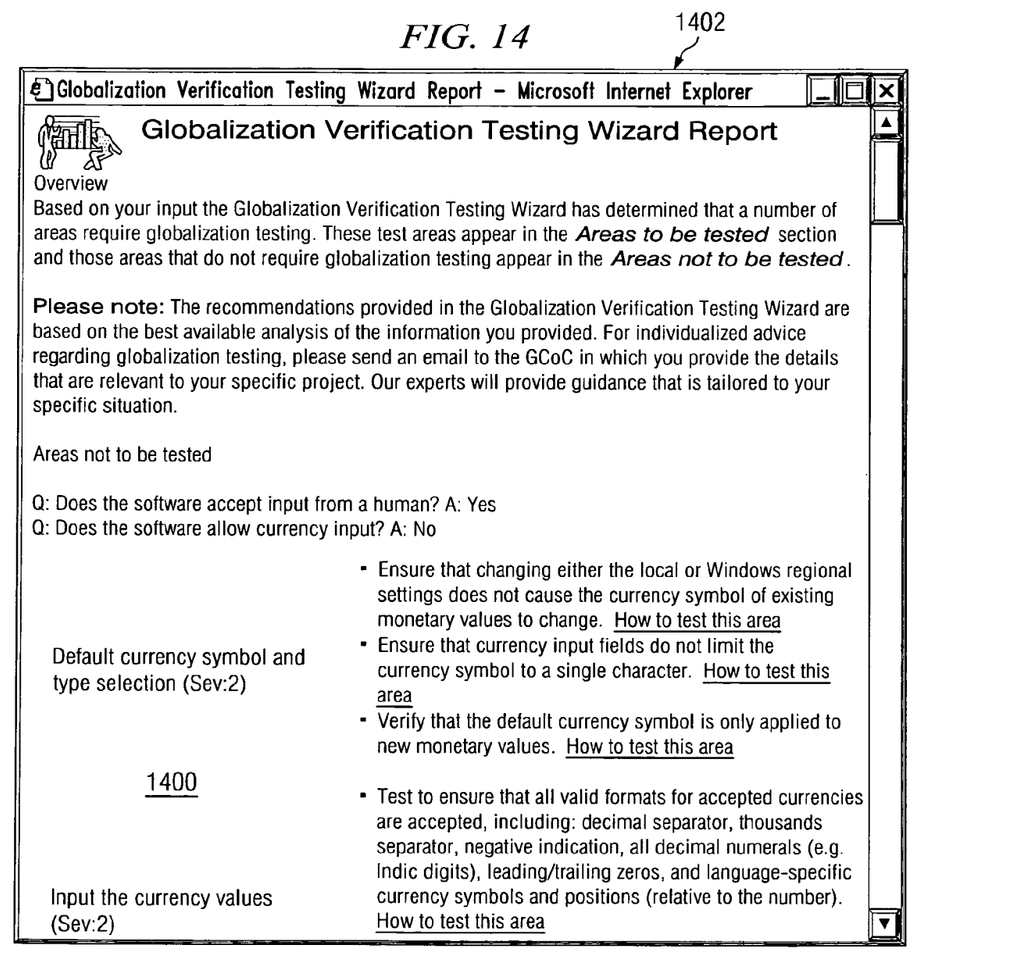
FIG. 14 is a diagram of a screen from a testing report in accordance with a preferred embodiment of the present invention.

With reference now to FIG. 14, a diagram of a screen from a testing report is depicted in accordance with a preferred embodiment of the present invention. Report 1400 is displayed in screen 1402 in these illustrative examples. This particular screen shows areas that are not to be tested.

The information illustrated in FIGS. 13 and 14 may be included in a template document, such as template document 408 in FIG. 4. Areas to be tested are placed into the template. Areas not to be tested are used to validate that an area has not been overlooked. Optionally the untested information may be placed into the template.

Figure 15:
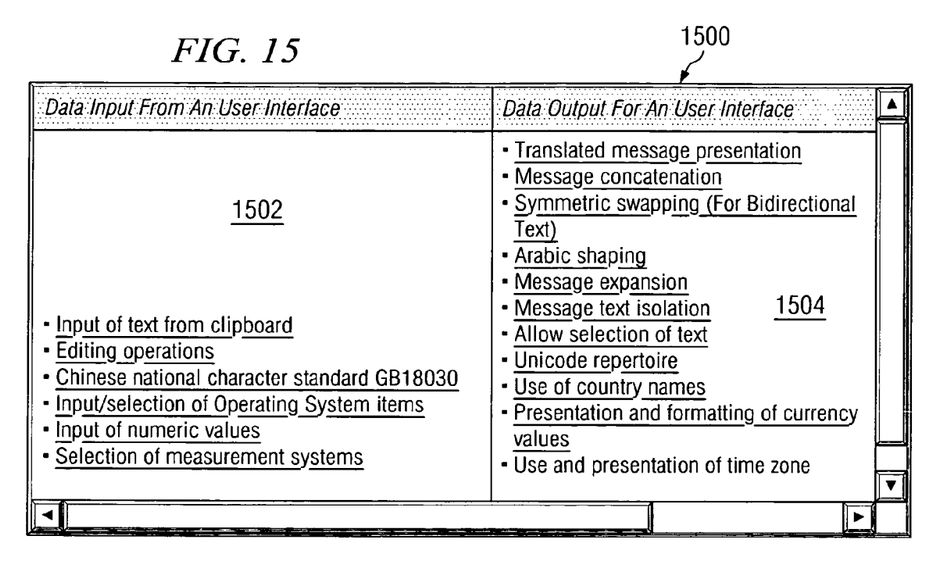
FIG. 15 is a diagram of a testing guide in accordance with a preferred embodiment of the present invention.

With reference now to FIG. 15, a diagram of a testing guide is depicted in accordance with a preferred embodiment of the present invention. In this example, screen 1500 displays a number of different test areas that may have been identified by the globalization testing process. In these examples, the test areas are categorized into different function aspects in which the different areas are dependent on factors, such as, for example, product type and user scenarios. Screen 1500 illustrates examples of test areas for data input from a user interface in section 1502 and data output for a user interface in section 1504.

Figure 16:
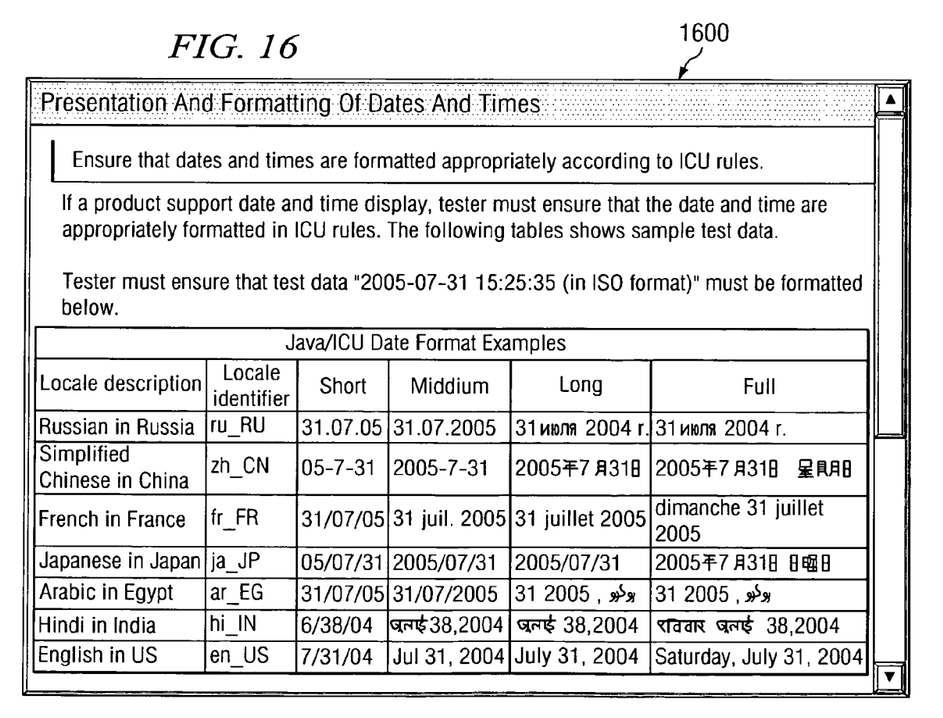
FIG. 16 is an example of specific testing data and instructions illustrated in accordance with a preferred embodiment of the present invention.

Turning now to FIG. 16, an example of specific testing data and instructions is illustrated in accordance with a preferred embodiment of the present invention. This information is displayed when a link such as those illustrated in report 1300 in FIG. 13 is selected. Screen 1600 displays test data that may be used to test the presentation and formatting of dates and times. The data and instructions are presented to a user when a link from a testing report is selected by the user. Examples of these links are shown in testing report 1300 in FIG. 13.

Figure 17:
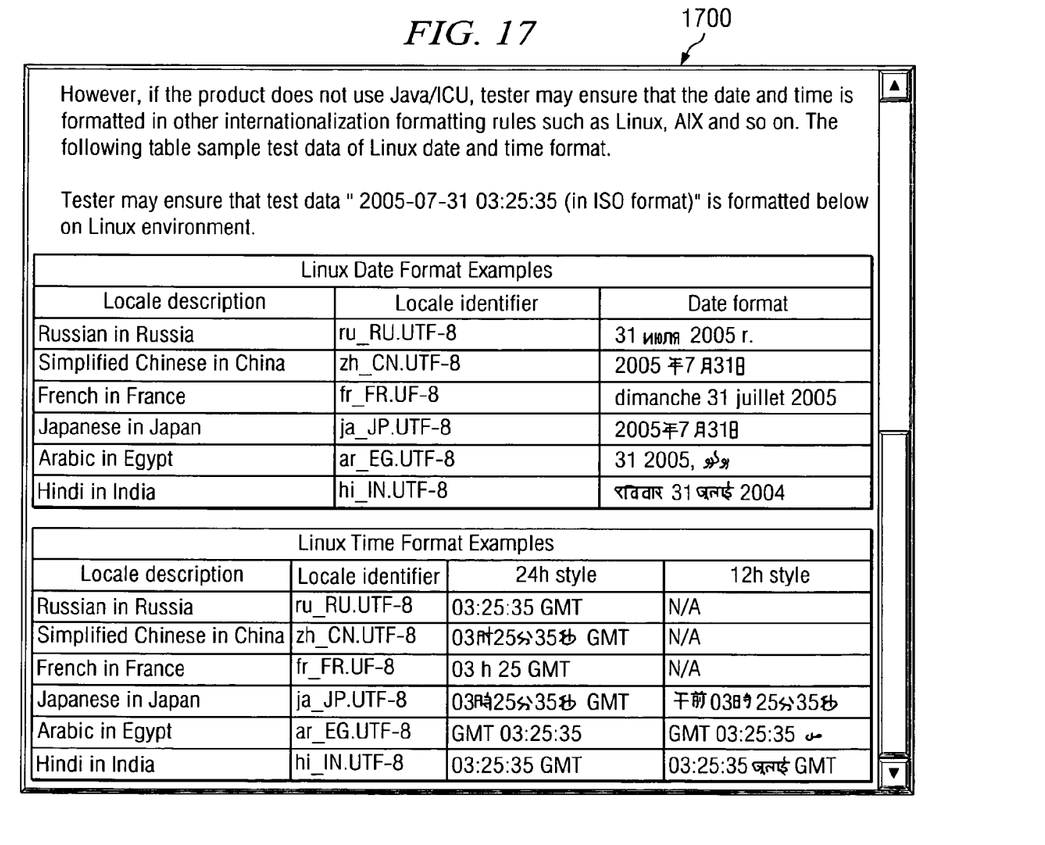
FIG. 17 is a diagram illustrating testing data and instructions in accordance with a preferred embodiment of the present invention.

Turning next to FIG. 17, a diagram illustrating testing data and instructions is depicted in accordance with a preferred embodiment of the present invention. This information is displayed when a link, such as those illustrated in report 1300 in FIG. 13, is selected. In this example, screen 1700 shows Linux test data used for ensuring that data and time is formatted according to various formatting rules such as those required by Linux or AIX operating systems.

Figure 18:
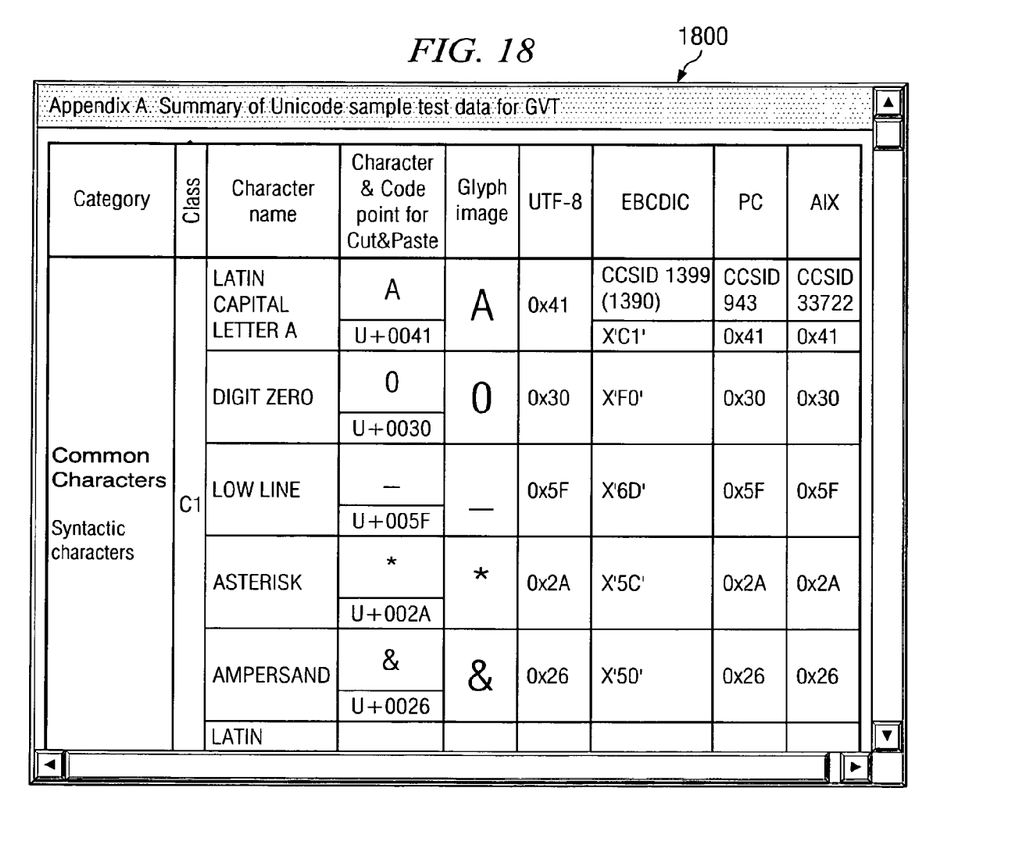
FIG. 18 is a diagram illustrating test data in accordance with a preferred embodiment of the present invention.

Turning next to FIG. 18, a diagram illustrating test data is depicted in accordance with a preferred embodiment of the present invention. This information is displayed when a link, such as those illustrated in report 1300 in FIG. 13, is selected. In this illustrative embodiment, screen 1800 shows Unicode test data that may be used for testing different aspects or parts of an application.

Figure 19:
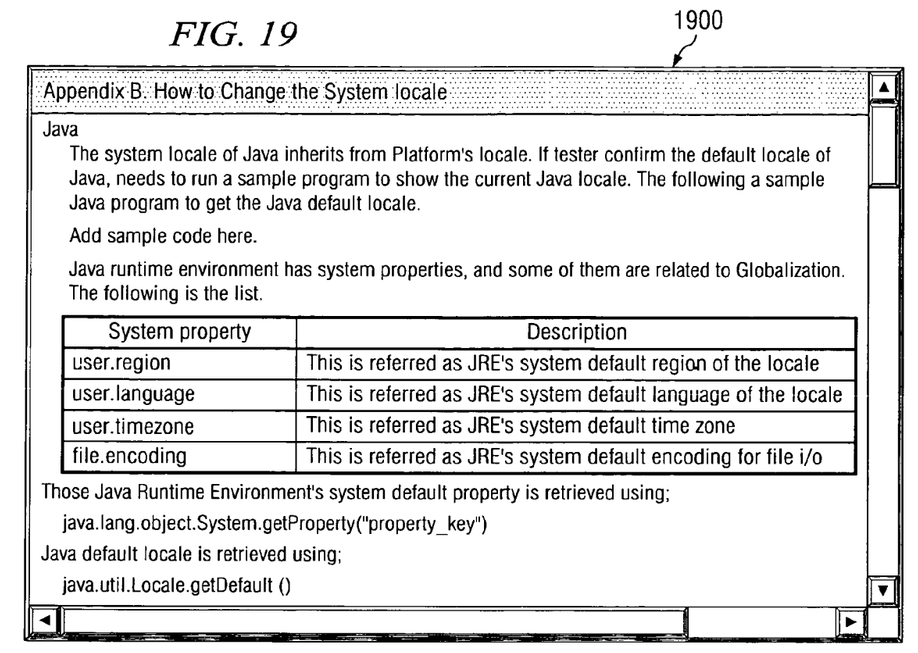
FIG. 19 is a diagram illustrating testing instructions in accordance with a preferred embodiment of the present invention.

Turning next to FIG. 19, a diagram illustrating testing instructions is depicted in accordance with the preferred embodiment of the present invention. Screen 1900 shows instructions on changing system locale. This information is displayed when a link, such as those illustrated in report 1300 in FIG. 13, is selected.

Figure 20:
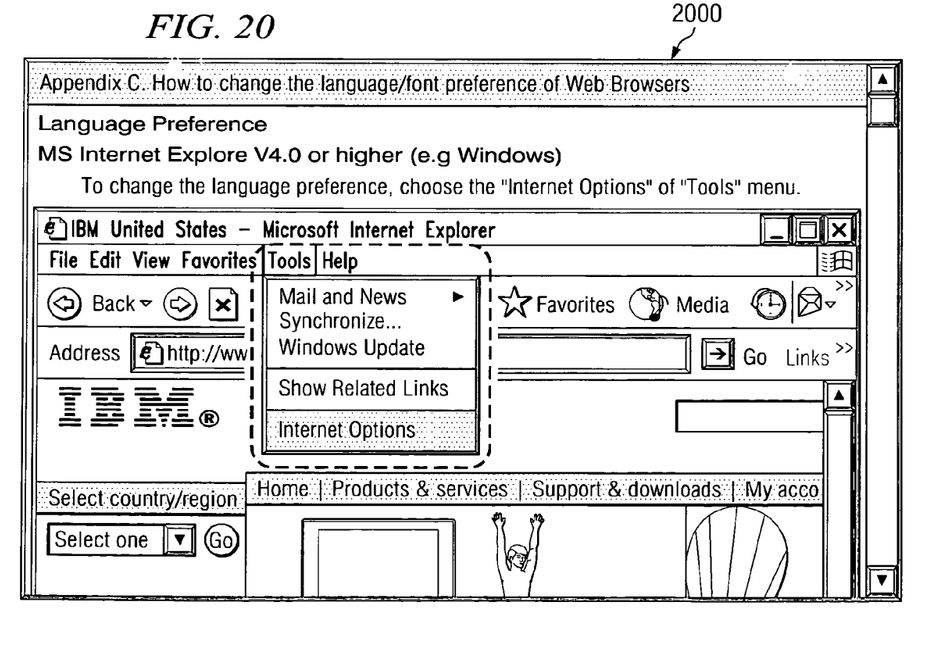
FIG. 20 is a diagram illustrating instructions for testing an application in accordance with a preferred embodiment of the present invention.

With reference next to FIG. 20, a diagram illustrating instructions for testing an application is depicted in accordance with the preferred embodiment of the present invention. This information is displayed when a link, such as those illustrated in report 1300 in FIG. 13, is selected. Display 2000 illustrated testing instructions on changing language preferences for a Web browser.

Figure 21:
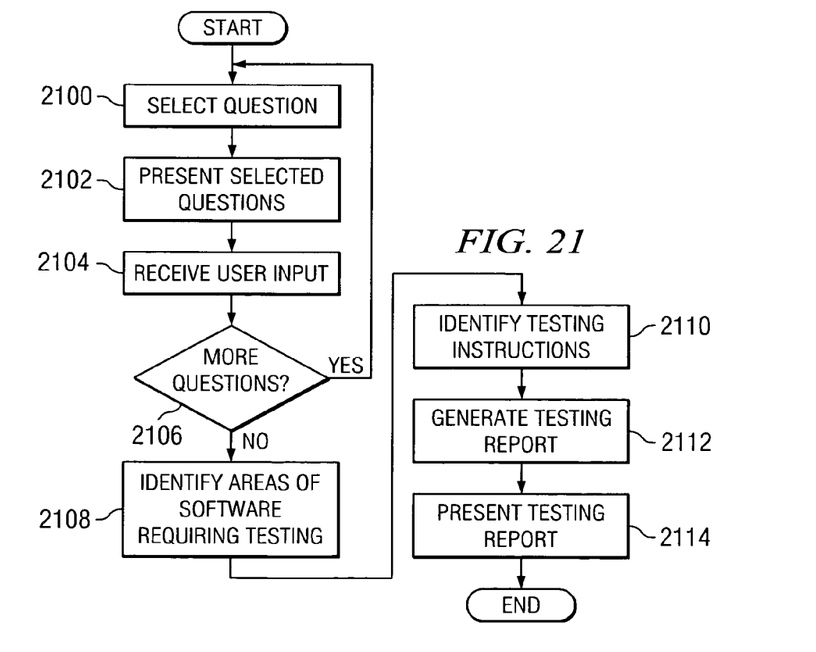
FIG. 21 is flowchart of a process for generating a testing report in accordance with a preferred embodiment of the present invention.

With reference now to FIG. 21, flowchart of a process for generating a testing report is depicted in accordance with the preferred embodiment of the present invention. The process illustrated in FIG. 21 may be implemented in a testing system, such as testing process 400 in FIG. 4.

The process begins by selecting the question (step 2100). The question selected from a database, such as testing database 404 in FIG. 4. This database contains questions and answers for different requirements for the aspect of the application being tested. In these illustrative examples, the aspect being tested relates to globalization requirements for an application. Of course, other aspects, such as accessibility and security may be tested using this process.

Next, the selected questions are presented (step 2102). In these examples, the question is presented through a graphical user interface, such as graphical user interface 402 in FIG. 4. User input is received in response to presenting the questions (step 2104). Thereafter, a determination is made as to whether more questions are to be selected and presented (step 2106). This determination is made based on the number of questions remaining to be asked and the user's answer to the question. For example, the user input may require an additional question or more detailed questions to be selected and presented for the user to enter answers. Alternatively, another question may be selected for presentation from a series of questions for this particular application. If additional questions are to be selected for presentation, the process returns to step 2100.

If additional questions are not to be presented to the user, areas of the application requiring testing are identified (step 2108). These areas are identified based on the questions and answers made during the presentation of questions. Based on the areas of the application that require testing, testing instructions are identified (step 2110). These testing instructions include instructions, such as those illustrated in FIGS. 16-20. These testing instructions are associated with the areas requiring testing through links. All of this information is placed into a testing report that is generated (step 2112). Thereafter, the testing report is presented (step 2114) with the process terminating thereafter.

Thus, in this manner the mechanism of the present invention provides an improved method, apparatus, and computer instructions for the testing of applications for various aspects. In these illustrative examples, the aspect shown involves global verification. Of course, the mechanism of the present invention may be applied to other aspects of applications, such as, for example, accessibility and security. Further, although the illustrative examples are directed towards applications, the mechanism of the present invention may be applied to any software. For example, the process may be applied to operating systems, embedded software, middleware, and general software libraries.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for testing a software, the computer implemented method comprising:

providing a database comprising a plurality of questions, wherein each question in the plurality of questions indicates particular areas of the software that require globalization testing;

responsive to presenting, on a graphical user interface of the data processing system, a set of questions from the plurality of questions to a user, receiving a user input to the set of questions presented to the user on the graphical user interface, wherein the set of questions is selected from the database;

responsive to receiving the user input to the set of questions, identifying test instructions corresponding to the particular areas of the software that require globalization testing due to the particular areas of the software having product features which are sensitive to language changes, based on the user input to form identified test instructions;

responsive to identifying the test instructions, generating a testing report using the identified test instructions, wherein the testing report comprises at least one link to detailed test instructions that describe tests to be performed on the particular areas of the software that require globalization testing, wherein selecting the at least one link displays the detailed test instructions, wherein the testing report further comprises areas of the software that are not to be tested;

testing the particular areas of the software that require globalization testing using the detailed test instructions; and generating a completion report in response to the testing of the particular areas of the software that require globalization testing, wherein the completion report includes an identification of what tests were performed and results of the testing of the particular areas of the software that require globalization testing.

2. The computer implemented method of claim 1, further comprising:

determining whether the user input indicates that another question in the plurality of questions should be presented; and responsive to determining that the user input indicates that the another question should be presented, selecting the another question from the database and presenting the another question.

3. The computer implemented method of claim 1, wherein the testing report further comprises testing data for use with the detailed test instructions, and wherein the identified test instructions and testing data are used to determine whether currency, dates, and times for a given language are displayed properly by the particular areas of the software with respect to globalization testing requirements.

4. The computer implemented method of claim 1, wherein the testing report further comprises testing data for use with the detailed test instructions.

5. The computer implemented method of claim 4, wherein the testing data comprises data to be visually confirmed on a display of a data processing system.

6. A computer implemented method for globalization verification testing of software, the computer implemented method comprising:

providing a database comprising a plurality of globalization verification questions, wherein each globalization verification question indicates areas of the software that need to be tested for one of language influences and cultural influences;

presenting, on a graphical user interface of a data processing system, a set of globalization verification questions from the plurality of globalization verification questions, wherein the set of globalization verification questions indicate areas of the software that require globalization testing;

receiving a user input to the set of globalization verification questions presented on the graphical user interface;

responsive to the user input to the set of globalization verification questions, selecting another globalization verification question from the database using the user input;

responsive to receiving the user input to the set of globalization verification questions, identifying test instructions based on the user input to form identified test instructions, wherein the identified test instructions identify particular areas of the software that require testing for globalization requirements due to the particular areas of the software having product features which are sensitive to language changes, wherein the globalization requirements include at least one of language influences and cultural influences;

responsive to identifying the test instructions, generating a testing report using the identified test instructions, wherein the testing report comprises links to detailed test instructions that describe tests to be performed on the particular areas of the software that require testing for globalization requirements, wherein the testing report further comprises areas of the software that are not to be tested;

testing the particular areas of the software that require testing for globalization requirements using the detailed test instructions; and generating a completion report in response to the testing of the particular areas of the software that require testing for globalization requirements, wherein the completion report includes an identification of what tests were performed and results of the testing of the particular areas of the software that require testing for globalization requirements.

7. The computer implemented method of claim 6, wherein the testing report further comprises testing data for use with the detailed test instructions.

8. The computer implemented method of claim 7, wherein the testing data comprises data to be visually confirmed on a display of a data processing system.

* * * * *